United States Patent
Soderquist et al.

(10) Patent No.: US 6,206,417 B1
(45) Date of Patent: Mar. 27, 2001

(54) AIR BAG INFLATOR EXIT GAS DISPERSION FEATURES

(75) Inventors: Quin Soderquist; Michael P. Jordan, both of South Weber; Christopher Hock, Uintah, all of UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 09/074,704

(22) Filed: May 8, 1998

(51) Int. Cl.$^7$ ................................................... B60R 21/26
(52) U.S. Cl. ........................ 280/736; 280/740; 280/741; 280/742
(58) Field of Search .................................. 280/736, 740, 280/741, 742

(56) References Cited

U.S. PATENT DOCUMENTS

| | | | |
|---|---|---|---|
| 4,578,247 | * 3/1986 | Bolieau | 280/711 |
| 5,064,218 | 11/1991 | Hartmeyer . | |
| 5,193,846 | 3/1993 | Allard . | |
| 5,259,641 | 11/1993 | Schenk . | |
| 5,368,327 | 11/1994 | Shiraki . | |
| 5,423,570 | * 6/1995 | Kort et al. | 280/736 |
| 5,501,484 | 3/1996 | Saderholm . | |
| 5,709,406 | * 1/1998 | Buchanan | 280/737 |
| 5,746,445 | * 5/1998 | Johnson et al. | 280/741 |
| 5,836,608 | * 11/1998 | Soderquist et al. | 280/728.2 |
| 5,860,672 | * 1/1999 | Petersen | 280/728.2 |

FOREIGN PATENT DOCUMENTS 36 04 843 A1   2/1986  (DE) .

* cited by examiner

Primary Examiner—Eric Culbreth
(74) Attorney, Agent, or Firm—Sally J. Brown

(57) ABSTRACT

An air bag device that includes an air bag cushion, a diffuser canister, and a gas generation inflator. The diffuser canister is attached to the air bag cushion and has walls configured to define an interior space therein. The walls of the diffuser canister have an interior surface, an exterior surface, and a wall thickness t. At least one of the walls has an aperture formed therethrough in communication with the interior of the air bag cushion. The gas generation inflator is configured to rapidly create a gas that exists the diffuser canister through the aperture so as to fill the air bag cushion. The aperture is defined by an edge extending between the interior and said exterior surfaces of the wall that is configured to diffuse the gas exiting the diffuser canister through the aperture. The edge of the aperture is configured such that the cross-sectional area of the aperture that is proximate to the exterior surface of the wall is larger than the cross-sectional area of the aperture proximate to the interior surface of wall. The edge includes an angled portion configured such that opposing sides of the aperture have an angle $\alpha$ therebetween in the range of about 20 degrees to about 145 degrees. The aperture has a diameter $d_1$ proximate to the interior surface of the wall and is configured so that the diameter $d_1$ and wall thickness t have a ratio $d_1$ to t in the range of about 0.5 to about 4.

10 Claims, 5 Drawing Sheets

AIR BAG INFLATOR EXIT GAS DISPERSION FEATURES

BACKGROUND OF THE INVENTION

1. The Field of the Invention

The present invention relates to a safety device used particularly in automobiles which, upon the onset of a collision, deploys an inflatable restraint cushion, known as an air bag cushion, to protect the occupants of the vehicle from the impact of the collision. More particularly, this invention relates to an apparatus for protecting the inside surface of an air bag cushion from the hot concentrated gases generated during the deployment of the air bag cushion.

2. The Relevant Technology

An air bag assembly typically includes a diffuser canister that encloses or is attached to a gas generator commonly known as an inflator, at least part of an air bag cushion, and may include a cover which conceals the air bag assembly from view. The air bag assembly is often considered as a module, and the industry is constantly trying to reduce the size of the air bag assembly.

When the vehicle, usually an automobile, is involved in a collision, a crash signal actuates the gas generation inflator to cause the air bag cushion to deploy. Typically, the actuator triggers a chemical or pyrotechnic reaction in the gas generator inflator. The reaction in gas generation inflator produces an inert gas, usually nitrogen, which is directed under pressure into the air bag cushion to force the air bag cushion out of the diffuser canister and into the passenger compartment of the vehicle. In a pyrotechnic-type gas generation inflator, gas is produced by the burning of a gas-generating material.

As the air bag cushion is forced out of the diffuser canister during deployment, the pressure exerted on the cover causes selected portions of the cover to separate in a predetermined manner along tear seams to enable the air bag cushion to be directed into the passenger compartment. As the air bag cushion is directed into the passenger compartment, it is inflated by the continued flow of gas produced by the gas generation inflator. Air bag assemblies are typically installed in the steering column of the vehicle, and another air bag assembly is placed in the instrument panel or dashboard on the passenger side of the vehicle. An air bag cushion is usually made of a synthetic material that is substantially impermeable to the flow of gas.

Initially during the air bag cushion deployment, prior to the air bag cushion rupturing the tear seams of the cover, the gas generation inflator generates a large volume of hot gases under high pressure. The hot gases exiting the gas generation inflator and diffuser canister impact the inside surface of the air bag cushion. This is particularly problematic for the portions of the inside surface of the air bag cushion that are proximate to the apertures formed in the diffuser canister through which the gases exit the diffuser canister and gas generation inflator and enter the air bag cushion. In most cases, the apertures are smooth and round which causes the gas exiting the diffuser canister to be in a concentrated stream of gas. The concentrated stream of gas exits the diffuser canister so quickly at such a high pressure and with such force that the inside surface of the air bag cushion is damaged. When the reaction occurring in the gas generation module creates hot gases, the concentrated streams of gas scorch the inside surface of the air bag cushion and may even burn through the air bag cushion. If a more energetic deployment takes place, the hot gases generated by the gas generation inflator can structurally affect the air bag cushion.

Designers of the air bag assemblies have been limited in what type of reactions can be used to deploy the air bag cushion by the temperature and/or pressure of the gases exiting the diffuser canister that can withstand the air bag cushion.

Several different types of changes have been made to the air bag assembly to attempt to solve the problems caused by the concentrated streams of gas damaging the inside surface of the air bag cushion. One attempt to reduce the damage to the inside surface of the air bag cushion has been to add extra linings or layers to the air bag cushion to those areas where the concentrated streams of gas come into contact with the material of the air bag cushion. One type of added layer that has been incorporated in the air bag cushion is a combined heat and energy absorbing bag. The liner is in the form of a fiberglass bag, but is not stretchable or a low porosity bag. This inner bag limits the design of air bag cushions as well as the size that the module can be reduced to. Adding additional layers or linings to portions of the air bag cushion increases the manufacturing steps, the manufacturing time, and the cost of the air bag cushion itself. Additional layers, of even just the synthetic material that the air bag cushion is usually made up of, also increases the amount of space that the stored air bag will require, and becomes a limiting factor when trying to reduce the size of the module.

Other attempts to protect the inside of the air bag cushion have included attaching some type of a deflector on the diffuser canister or making a deflector that is movably positioned between the diffuser canister and the inside surface of the air bag. One deflector consisted of a metal sheet that was formed into an open ended cylinder to act as a heat shield around the diffuser canister. The shield provided protection to the air bag cushion immediately adjacent to the inflator. Another attempt to protect the inside surface of the air bag cushion incorporated a fabric heat shield that was attached to the air bag cushion. When the air bag cushion was deployed, the streams of concentrated gases hit the fabric shield instead of the inside of the air bag cushion. Both of these methods, however, required the use of additional pieces in the air bag assembly. It was particularly difficult, when assembling the diffuser canister and the air bag cushion to insure that the fabric shield was in the right position to intersect the concentrated flow of gases. Both of these deflectors, as well as similar methods, also limited how small the air bag assembly module could be made.

SUMMARY AND OBJECTS OF THE INVENTION

It is an object of the present invention to protect the inside surface of the air bag cushion from the concentrated streams of gases produced during deployment of the air bag cushion without increasing the thickness of the air bag cushion.

Another object of the present invention is to protect the inside surface of the air bag cushion from the concentrated streams of gases produced during deployment of the air bag cushion without increasing the number of parts in the air bag cushion assembly.

Another object of the present invention is to protect the inside surface of the air bag cushion from very hot gases exiting the diffuser canister.

A further object of the present invention is to disperse the streams of gas exiting the diffuser canister to reduce or eliminate any damage the gases cause to the inside surface of the air bag cushion.

A further object of the present invention is to cause turbulence in the streams of gas exiting the diffuser canister thereby reducing or eliminating the damage the gases cause to the inside surface of the air bag cushion.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, an air bag device is provided that comprises an air bag cushion, a diffluser canister, and a gas generation inflator. The diffuser canister is attached to the gas inlet opening of the air bag cushion and has walls configured to define an interior space therein. The walls of the diffuser canister have an interior surface, an exterior surface, and a width of thickness t. At least one of the walls has an aperture formed therethrough in communication with the interior of the air bag cushion. The aperture is defined by an edge extending between the interior and said exterior surfaces of the wall. The gas generation inflator is configured to rapidly create a gas that exits the diffuser canister through the aperture so as to fill the air bag cushion. The air bag device also comprises a dispersing means for diffusing the gas exiting the diffluser canister through the aperture. The dispersing means comprises the edge that defines the perimeter of the aperture and is configured such that the cross-sectional area of the aperture that is proximate to the exterior surface of the wall is larger than the cross-sectional area of the aperture proximate to the interior surface of the wall. The edge of the aperture comprises an angled portion. The angled portion of the edge on opposing sides of the aperture has an angle α therebetween of about 20 degrees to about 145 degrees. The aperture has a diameter $d_1$ proximate to the interior surface of the wall and the diameter $d_1$ compared to the wall thickness t has a ratio of about 0.5 to about 4.

An alternate embodiment of the air bag device comprises an air bag cushion, a diffuser canister, and a gas generation inflator. The diffuser canister has a plurality of walls configured to define an interior space therein. Each of the walls has an interior surface and an exterior surface. One of the walls has at least one aperture formed therethrough in communication with the interior of said air bag cushion. This embodiment of an air bag device includes means for causing turbulence in the gas exiting the diffuser canister through the aperture that comprises an edge defining the periphery of the aperture. The edge has an angled portion that is configured such that the cross-section of aperture is non-smooth, and consequently, causes turbulence in said gas.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention relates to an air bag assembly that is configured to cause the gases that are rapidly created in a gas generation inflator to flow out a diffuser canister and into an air bag cushion while simultaneously diffusing the gas stream and/or causing turbulence in the gas stream to reduce the damage that a concentrated stream of gas has on the inside surface of the air bag cushion. One embodiment of an air bag assembly is shown generally in FIGS. 1 and 2 at 10, and includes a gas generation inflator 12, a diffuser canister 14, and an air bag cushion 16.

Figure 1:
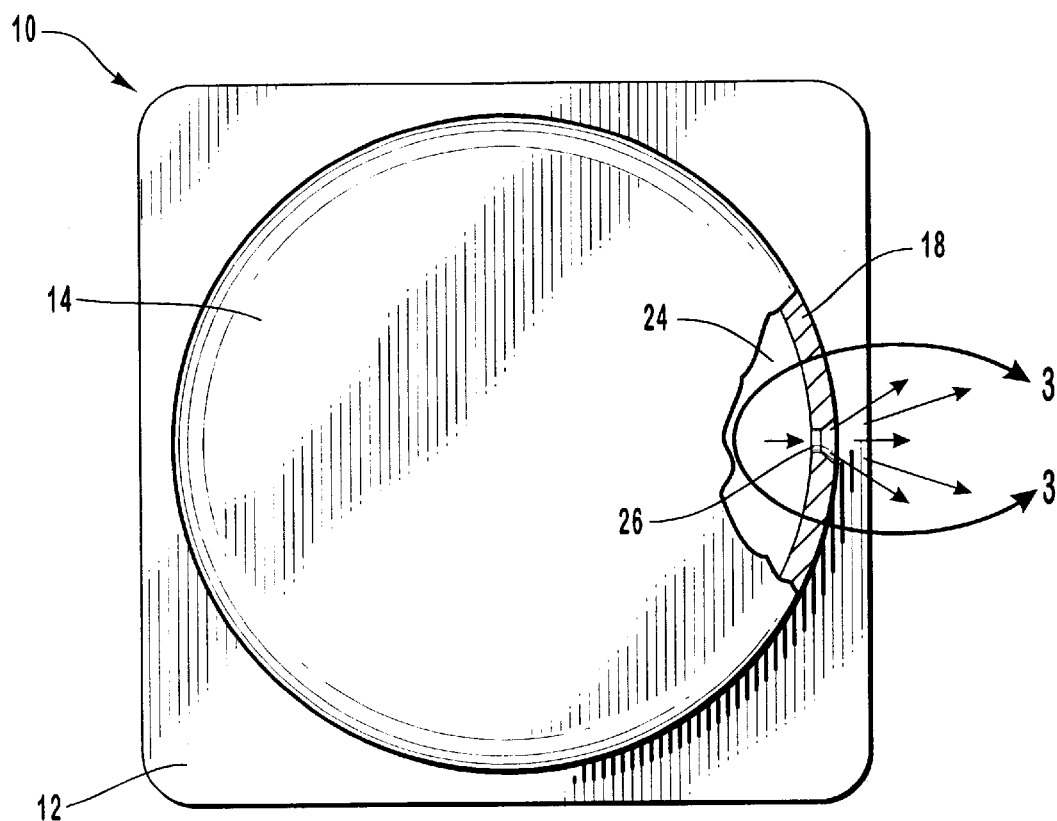
FIG. 1 is a partial cross-sectional elevation view of the air bag assembly during the deployment of the air bag cushion.
Figure 2:
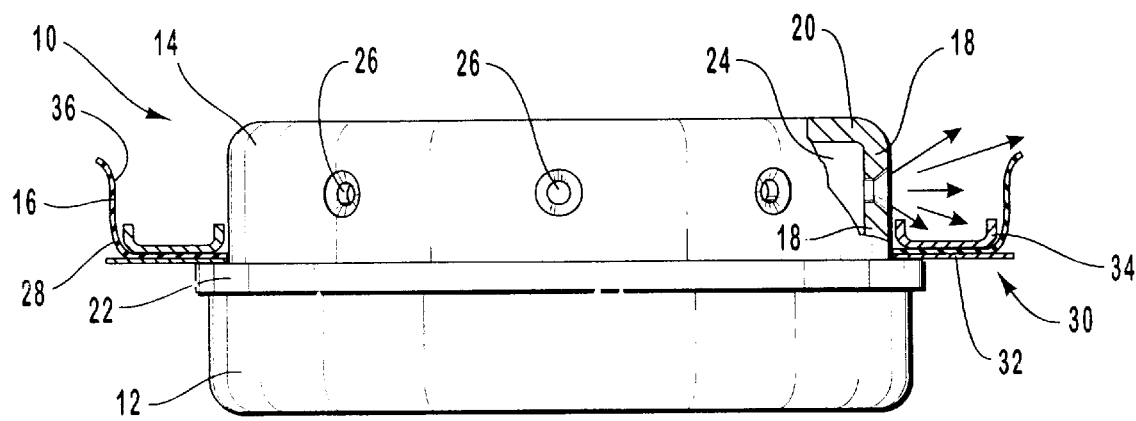
FIG. 2 is a partial cross-sectional elevation view of the structure of FIG. 1 with an air bag cushion attached thereto.

Gas generation inflator 12 is depicted in FIGS. 1 and 2 as being substantially square-shaped. Gas generation inflator 12 has a flange 22 that is configured to cooperate with diffuser canister 14. Flange 22 may have various other configurations as long as it cooperates with diffuser canister 14. Gas generation inflator 12 is configured to securely contain reactants therein that upon the happening of a crash will be actuated to trigger a reaction, including a chemical reaction or a pyrotechnic reaction, which rapidly creates enough gas to inflate air bag cushion 16. The specifics of the reaction is beyond the scope of this patent and are known by those skilled in the art.

Diffuser canister 14 is depicted as having a substantially round configuration. As illustrated in FIG. 2, diffuser canister 14 includes a side wall 18 and a top wall 20. Top wall 20 defines a closed end of diffuser canister 14 while the remote end of side wall 18 defines an open end of diffluser canister 14 which cooperates with flange 22 of gas generation inflator 12. Side wall 18 and top wall 20 of diffuser canister 14 together with gas generation inflator 12 define an interior space 24. Side wall 18 may have various other configurations as long as the remote end of side wall 18 cooperates with flange 22 on gas generation inflator 12.

It can be appreciated that various other configurations and shapes of gas generation inflator 12 and diffuser canister 14 are equally effective at carrying out the intended function thereof. By way of example and not limitation, gas generation inflator 12 may have other shapes including rectangled, oval, or round. Similarly, diffuser canister 14 may have other configurations such as oval, octagonal, or elliptical. The important feature is that gas generation inflator 12 and diffuser canister 14 are configured to cooperate and define an interior space 24 in which a reaction which rapidly creates the gas takes place upon receiving the actuating signal.

Side wall 18 of diffuser canister 14 has apertures 26 formed therethrough as depicted in FIGS. 1 and 2. Apertures 26 are substantially equally spaced around side wall 18. It is preferred that diffuser canister 14 have between 6 to 60 apertures formed therein. One embodiment of diffuser canister 14 has twelve (12) apertures 26 formed through side wall 18. It can be appreciated by those skilled in the art that various other numbers and arrangements of apertures 26 are equally effective in carrying out the intended function thereof. Apertures 26 will be discussed in more detail below.

As previously mentioned, air bag assembly 10 includes air bag cushion 16. Air bag cushion 16 has a gas inlet opening 28, often referred to as a throat, and a closed end (not shown) that upon deployment of air bag cushion 16 will protect a person in the vehicle from impact. Gas inlet opening 28 of air bag cushion 16 is attached to flange 22 of gas generation inflator 12 by an attaching mechanism, such as a collar assembly 30 illustrated in FIG. 2. Collar assembly 30 holds gas inlet opening 28 of air bag cushion 16 in such a way that air bag cushion 16 is substantially sealed and the gas rapidly flowing into air bag cushion 16 is contained therein.

One embodiment of collar assembly 30 comprises a housing 32 and a retaining ring 34. Housing 32 may be mounted on flange 22 of gas generation inflator 12 by conventional methods including welding or bolting. Gas inlet opening 28 of air bag cushion 16 is positioned on housing 32 and retaining ring 34 is attached to housing 32 so as to hold air bag cushion 16 between housing 32 and retaining ring 34. One way that retaining ring 34 is attached to housing 32 is by bolts. It can be appreciated, however, that various other methods can be used including screws and brackets.

Various other attaching mechanisms or configurations of collar assembly 30 are equally effective in carrying out the intended function of attaching gas inlet opening 28 of air bag cushion 16 to gas generation inflator 12. Although air bag assembly 10 has been depicted as having air bag cushion 16 attached to flange 22 of gas generation inflator 12, it is contemplated that air bag cushion 16 could be mounted to a flange or collar formed on diffuser canister 14. The limitation with this alternate configuration is that apertures 26 must be unobstructed.

Prior to the occurrence of the gas producing reaction, it is preferred that apertures 26 be covered with a relatively thin covering, such as a foil (not shown). One type of foil that can be used is aluminum foil. The foil prevents moisture from entering interior space 24 and potentially interfering with the gas producing reaction that takes place in gas generation inflator 12. Upon receiving an actuation signal, typically in the form of an electric actuation signal from a crash sensor (not shown), the gas producing reaction is triggered in gas generation inflator 12. The foil covering aperture 26 also initially allows the pressure to build in interior space 24 after the reaction has been actuated and the gas is being created. Pressure within interior space 24 builds until it reaches a point that the gas being rapidly created in the gas generation inflator 12 bursts through the foil covering apertures 26 and escapes out diffuser canister 14 through apertures 26 into air bag cushion 16. The initial pressure build up in interior space 24 caused by the foil has been shown to improve the effectiveness and completeness of the gas producing reaction, particularly pyrotechnic reactions, occurring in gas generation inflator 12.

As previously discussed, gas generation inflator 12 rapidly produces gases that after breaking though the foil escape from interior space 24 through apertures 26 into air bag cushion 16. Typically, the gases produced by the pyrotechnic reaction and exiting diffuser canister 14 are concentrated, are hot, and are under pressure. As a result, these gases are potentially harmful to inside surface 36 of air bag cushion 16 and can damage the air bag cushion by scorching, melting, or even burning through air bag cushion 16. The design of apertures 26 plays a key role in substantially reducing and even totally preventing damage or other harmful effects from the hot gases to inside surface 36 of air bag cushion 16.

Figure 3:
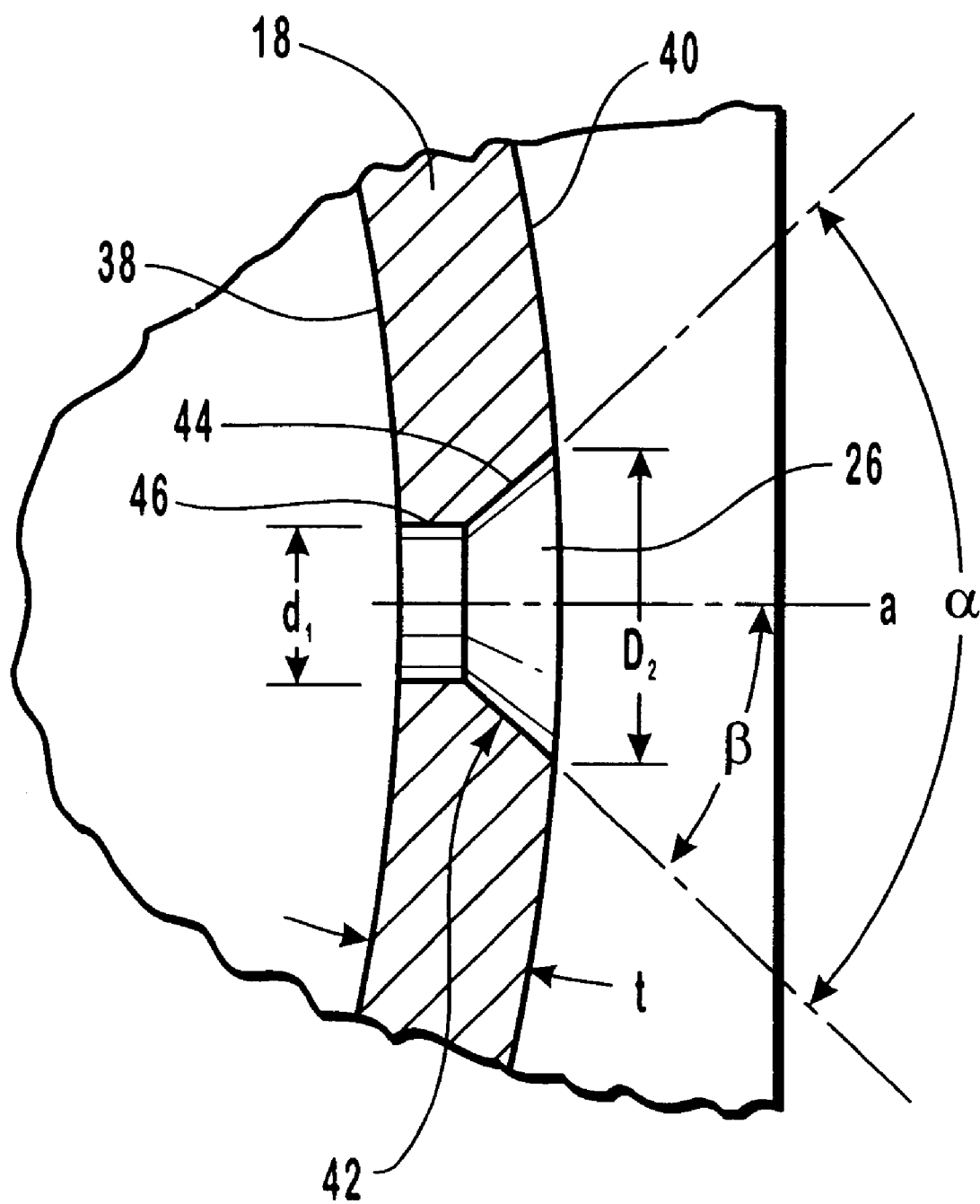
FIG. 3 is a partial cross-sectional view of the structure of FIG. 1 taken along the section line 3—3 therein.

According to another aspect of the present invention, air bag assembly 10 comprises dispersing means for difflusing the gas exiting diffuser canister 14 through apertures 26. The structure performing the function of such a dispersing means for diffusing the gases exiting diffuser canister 14 comprises an edge 42 that extends between an interior surface 38 of side wall 18 and an exterior surface 40 of side wall 18 as shown in FIG. 3. It is intended that "edge 42" is not necessarily one continuous surface. Instead, the term "edge 42" is intended to be broad enough to encompass the entire peripheral boundary of side wall 18 that defines aperture 26.

Edge 42 is at least partially comprised by an angled portion, such as angled portion 44 shown in FIG. 3. While the embodiment illustrated in FIGS. 1–3 has been countersunk, it is intended that aperture 26 with angled portion 44 can be formed by other conventional manufacturing methods. Aperture 26 as depicted in FIG. 3, actually comprises angled portion 44 that is at an angle relative to exterior surface 40 of side wall 18 and an optional portion 46 that is substantially parallel with the gas flow through aperture 26. Aperture 26 is equally effective without portion 46. Conventional manufacturing processes, such as by way of example and not limitation stamping and coining, usually result in a portion of edge 42 proximate to interior surface 38 being having a slightly different contour than angled portion 44. Regardless of the specific configuration of edge 42, aperture 26 will usually have a diameter $d_1$ proximate to interior surface 38 of side wall 18 that is smaller than diameter $D_2$ proximate to exterior surface 40.

Angled portion 44 is more significant than portion 46 in diffusing the gas stream. Angled portion 44 has an angled relationship equal to the angle β to the central axis a of aperture 26. An angle α extends between opposing angled portions 44 of aperture 26 shown in FIG. 3. Angle α may have a range of about 20 degrees to about 145 degrees. A more preferred range for the angle α is about 110 degrees to about 130 degrees. Most preferably angle α is 118 degrees. FIG. 3 depicts the angle α as being symmetric about the central axis a of aperture 26. There is, however, no requirement that the angle α be symmetric to the central axis a of aperture 26.

The reaction occurring in gas generation module 12 creates gas so quickly that once the foil over aperture 26 is broken the gas has a very high velocity and pressure. Diameter $d_1$ proximate to interior surface 38 limits the flow rate of the gases out of aperture 26. The configuration of edge 42, particularly the angle α of angled portion 44, allows the gas flowing though diameter $d_1$ toward diameter $D_2$ to expand. As the gas enters aperture 26 through diameter $d_1$ with a pressure $p_1$, velocity $v_1$, and temperature $T_1$, angled portion 44 allows the gas to expand and exit aperture through diameter $D_2$ with pressure $P_2$, velocity $V_2$ and temperature $T_2$. Consequently, the temperature and pressure of the gas exiting diameter $D_2$ are reduced as compared to the pressure $p_1$ and temperature $T_1$.

There are some limitations of the effectiveness of the angle α of angled portion 44. The ratio of the diameter $d_1$ of aperture 26 to the wall thickness t of side wall 18 is a limiting factor, because at some point the wall will be so thin that the angle α has minimal effect. However, because the gases exit diffuser canister 14 at such a high velocity and pressure when air bag cushion 16 is deployed the wall thickness t of side wall 18 can be very thin. The wall thickness t of side wall 18 may have a range of about 0.030 inches to about 0.3 inches. Preferably side wall 18 has a thickness of about 0.060 inches to about 0.130 inches. Diameter $d_1$ may have a range of about 0.5 inches to about 0.05 inches. It is preferred that diameter $d_1$ have a range of about 0.100 inches to about 0.160 inches. More important is the ratio of diameter $d_1$ to wall thickness t of side wall 18. The ratio of diameter $d_1$ to wall thickness t can be in the range from about 0.5 to about 4. The preferred diameter $d_1$ to wall thickness t ratio is about 0.9 to about 2.3.

As previously discussed, diffuser canister 14 has apertures 26 formed though side wall 18. Apertures 26 may or may not be evenly spaced around the periphery of diffuser canister 14. The spacing requirement of apertures 26 is dependent on the size and configuration of apertures 26. Apertures 26 may all be the same size or may be of varying sizes depending on the configuration of edge 42.

FIGS. 4–9 illustrate other embodiments of apertures formed through side wall 18 of diffuser canister 14. The majority of the features previously discussed relative to air bag assembly 10 apply to the other embodiments of the air bag assemblies. The features that are not affected are identified with the same reference numbers as used in FIGS. 1–3. Only those features that have changed will be described in detail.

Figure 4:
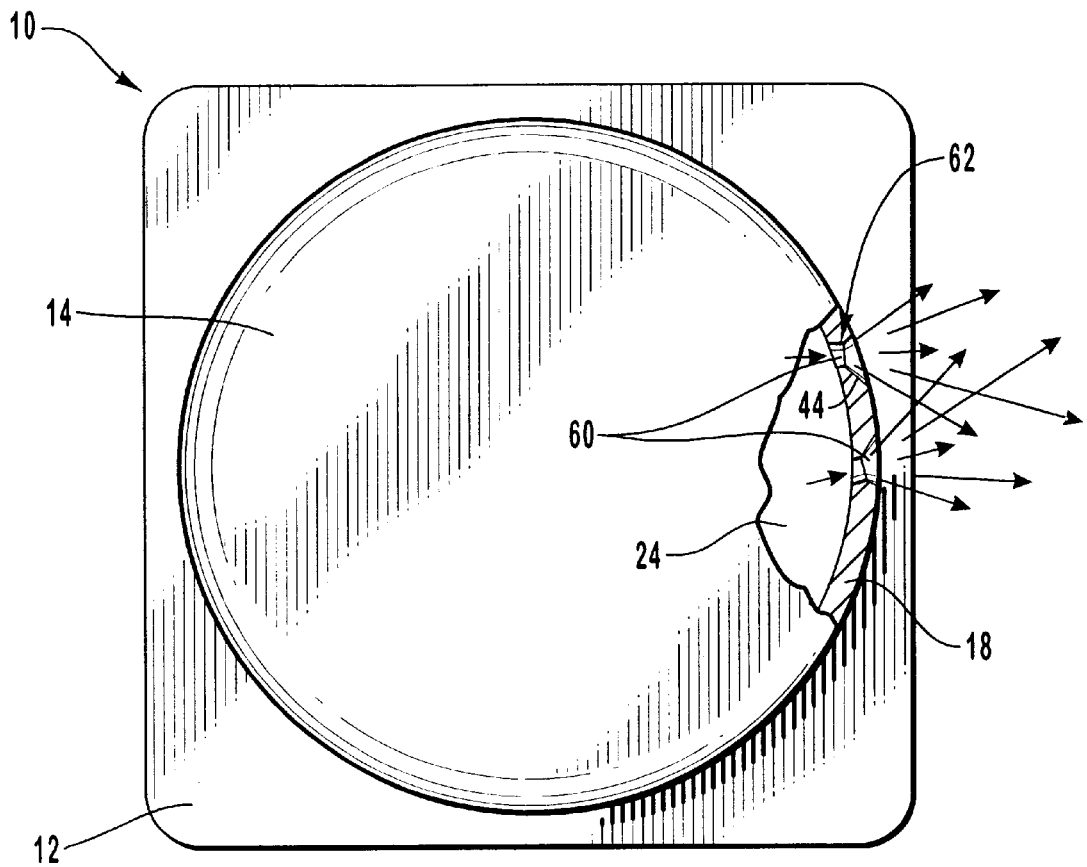
FIG. 4 is another embodiment of the apertures formed in the air bag assembly during the deployment of the air bag cushion.
Figure 5:
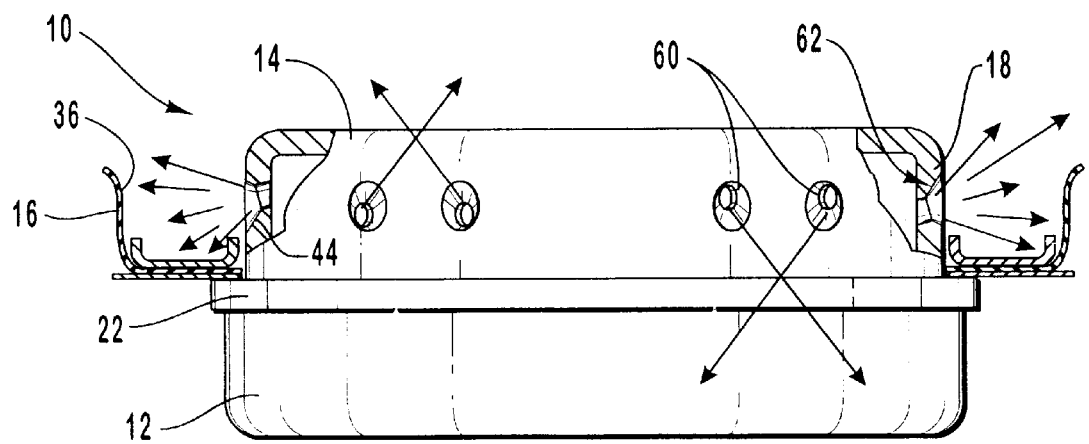
FIG. 5 is a partial cross-sectional elevation view of the structure of FIG. 4 with an air bag cushion attached thereto.

FIGS. 4 and 5 illustrate another embodiment of apertures 60 formed through side wall 18 of diffuser canister 14. According to another aspect of the present invention, air bag assembly 10 comprises means for causing turbulence in the gas exiting diffuser canister 14 through apertures 60. Structure performing the function of such a dispersing means for diffusing the gases exiting diffuser canister 14 comprises an edge 62.

Edge 62 comprises angled portion 44 with an angle α between opposing sides of aperture 60. Aperture 60 with edge 62 is angled such that the gas stream flowing out of aperture 60 is directed toward another aperture 60 to intersect the gas stream flowing from a similarly directed aperture 60. The intersection or impinging of the two streams of gas disrupts the gas stream and causes turbulence in the flow as will be discussed below. FIG. 5 illustrates several variations in the arrangement of apertures 60. Edge 62 with angled portion 44 also diffuses the gas exiting apertures 60.

Unlike apertures 26 illustrated in FIG. 2, apertures 60 are not evenly spaced around the periphery of diffuser canister 14. Instead, apertures 60 are arranged so that the those apertures 60 whose gas streams are intended to intersect are somewhat closer together. The distance between apertures 60, as well as the angle α and β of angled portion 44 of edge 62, determines where the streams of gas will intersect. It is to be understood that it is not necessary that apertures 60 be unevenly spaced around the perimeter of diffuser canister 14. Evenly spacing the apertures 60 carries out the intended function thereof equally effectively. Instead of adjusting the spacing, the angles α and β of angled portion 44 of edge 62 can be changed to cause the gas streams to cross. In addition, it is not necessary that apertures 60 be arranged in pairs. Instead apertures 60 could be arranged in threes, or fours or other arrangements to cause the streams of gas to intersect and create turbulence in the gas flow.

FIGS. 4 and 5 illustrate one possible arrangement where apertures 60 are arranged in pairs so that the gas stream flowing out each aperture 60 quickly impinges upon the gas stream flowing out another aperture 60. FIG. 5 also illustrates two variations in the configuration of aperture 60 itself. Apertures 60 on the left hand side of FIG. 5 are directed such that the flow is upwardly away from retaining ring 34. In contrast, apertures 60 illustrated on the right hand side of FIG. 5 are directed such that the gas flowing from apertures 60 is directed downward towards retaining ring 34. It is contemplated that apertures 60 may be arranged in an alternating manner as illustrated or in any other combination thereof. It is also contemplated that apertures 60 could direct the gas flow outward substantially perpendicular to exterior surface 40 of side wall 8 instead of upward or downward as illustrated in FIG. 5.

As previously mentioned, the intersection of the streams of gas disrupts the gas flowing out aperture 60 toward inside surface 36 of air bag cushion 16 and causes turbulence in the gas flow. In addition, angled portion 44 disperses the gas stream. FIGS. 4 and 5 also depict apertures 60 as being countersunk similar to apertures 26 illustrated in FIGS. 1–3. As shown in FIG. 4, edge 62 comprises angled portion 44 which in this embodiment is symmetric about the center axis of aperture each 60. Therefore, angle β is equal to one half of the angle α.

Although both FIGS. 4 and 5 depict apertures 60 as being countersunk, it is contemplated that apertures 60 could not have a countersink and that edges 62 that define apertures 60 may be parallel. In this embodiment, the diameter of apertures 60 would be constant. Apertures 60 would still direct the flow of gas out aperture 60 in such a direction as to impinge upon the flow of gas out an adjacent aperture 60 to cause turbulence in gas flowing out the apertures.

The advantage of using the countersink illustrated in FIGS. 4 and 5 is that the gas stream has been widened. Apertures 60 are capable of both causing turbulence and diffusing the gas flow. The turbulence caused by the intersecting streams of gas further disperses the gas and further reduces the pressure, velocity, and temperature of the gas stream. In some cases, it may not be necessary to both countersink and redirect the gas flow to intersect with other streams of gas. For example, depending on the type of reaction, and the type of material air bag cushion 16 is made of, it may be sufficient just to redirect the gas streams to intersect thereby disrupting the gas streams and causing turbulence. Widening and dispersing of the gas stream by the countersinking may not be needed. It is contemplated that any combination may be used.

It should be noted that as depicted in FIGS. 4 and 5, diameter $d_1$ adjacent to interior wall 38 has the same central axis a as the angled portion. This is not required. Instead, a two step operation could have been used to form diameter $d_1$ with a central axis a that is perpendicular to the exterior surface 40 of side wall 18, as shown in FIG. 3. A second operation could then be performed. In this configuration angle α would not be symmetric about the central axis a of aperture 60. In other words, the angle β would not be one half of the angle α. Either configuration of aperture is effective in carrying out the intended function thereof.

Figure 6:
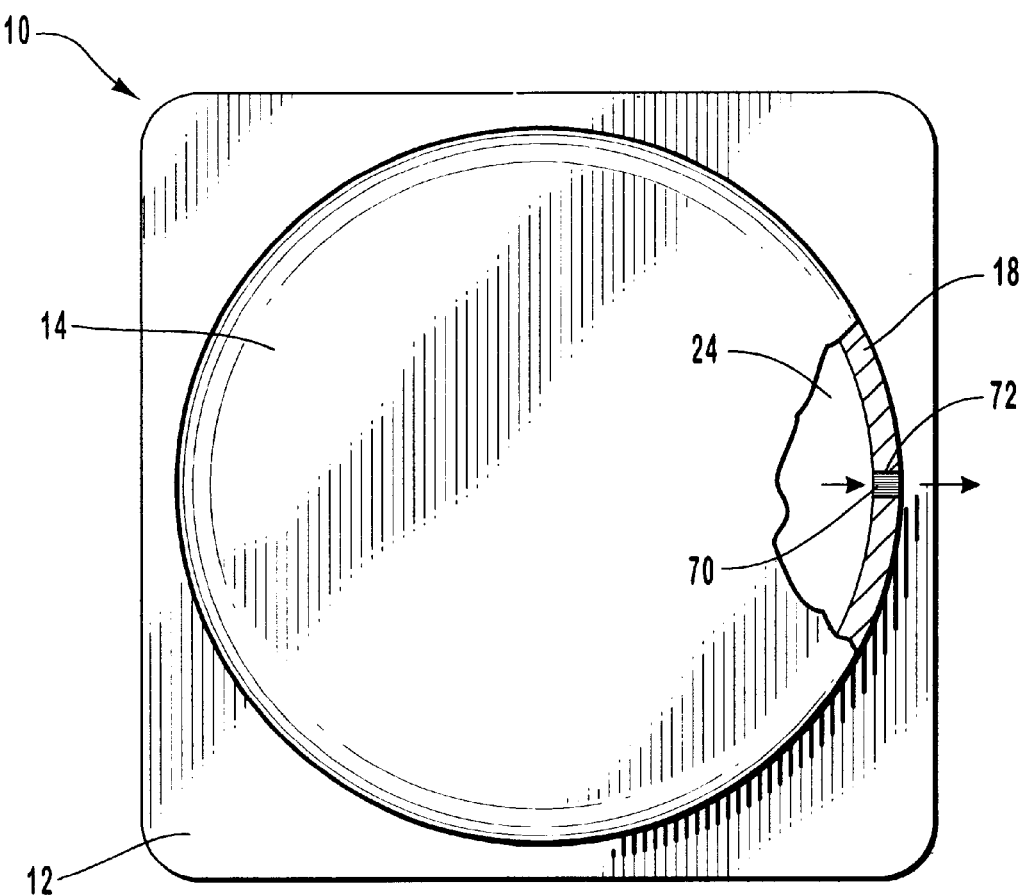
FIG. 6 is another embodiment of the apertures formed in the air bag assembly during the deployment of the air bag cushion.
Figure 7:
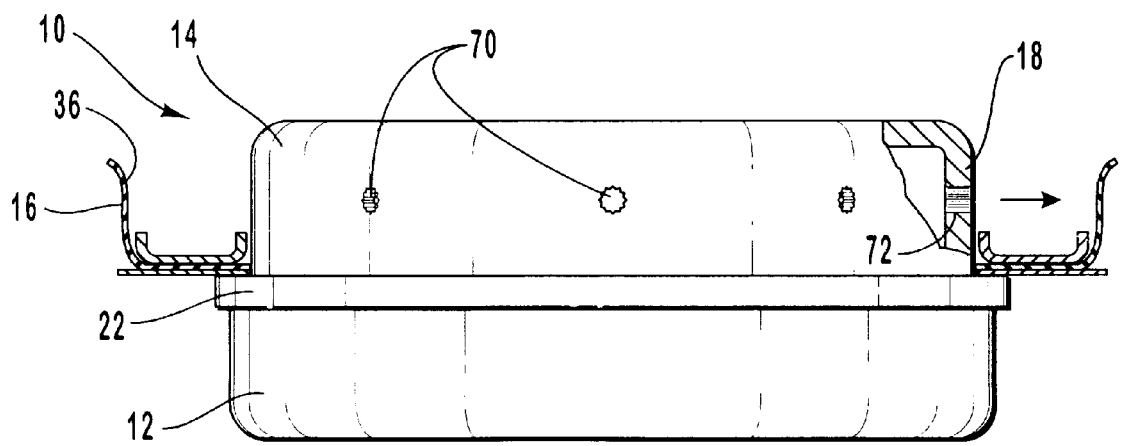
FIG. 7 is a partial cross-sectional elevation view of the structure of FIG. 6 with an air bag cushion attached thereto.

FIGS. 6 and 7 depict another embodiment of apertures 70 formed through side wall 18 diffuser canister 14. As depicted, apertures 70 are "star-shaped". Unlike apertures 26 and 60 illustrated in FIGS. 1–5, apertures 70 are defined by an edge 72 that is substantially perpendicular to the exterior surface 40. The non-smooth configuration of apertures 70 creates turbulence in the stream of gas that is flowing out of apertures 70 which reduces the concentration of the gas and helps reduce the temperature of the stream of gas flowing out of apertures 70. Although apertures 70 are depicted as star-shaped, apertures 70 can have various other shapes as long as the periphery defined by edge 72 is non-smooth and irregular. By way of example and not limitation, other non-smooth shapes include any scalloped-shaped opening.

It can be appreciated by those skilled in the art that conventional manufacturing processes, such as by way of example and not limitation, stamping and coining, may result in a portion of edge 72 proximate to interior surface 38 of side wall 18 having a slightly different contour than the rest of edge 72. This might be caused by tearing or deformation of side wall 18 during the manufacturing process.

Figure 8:
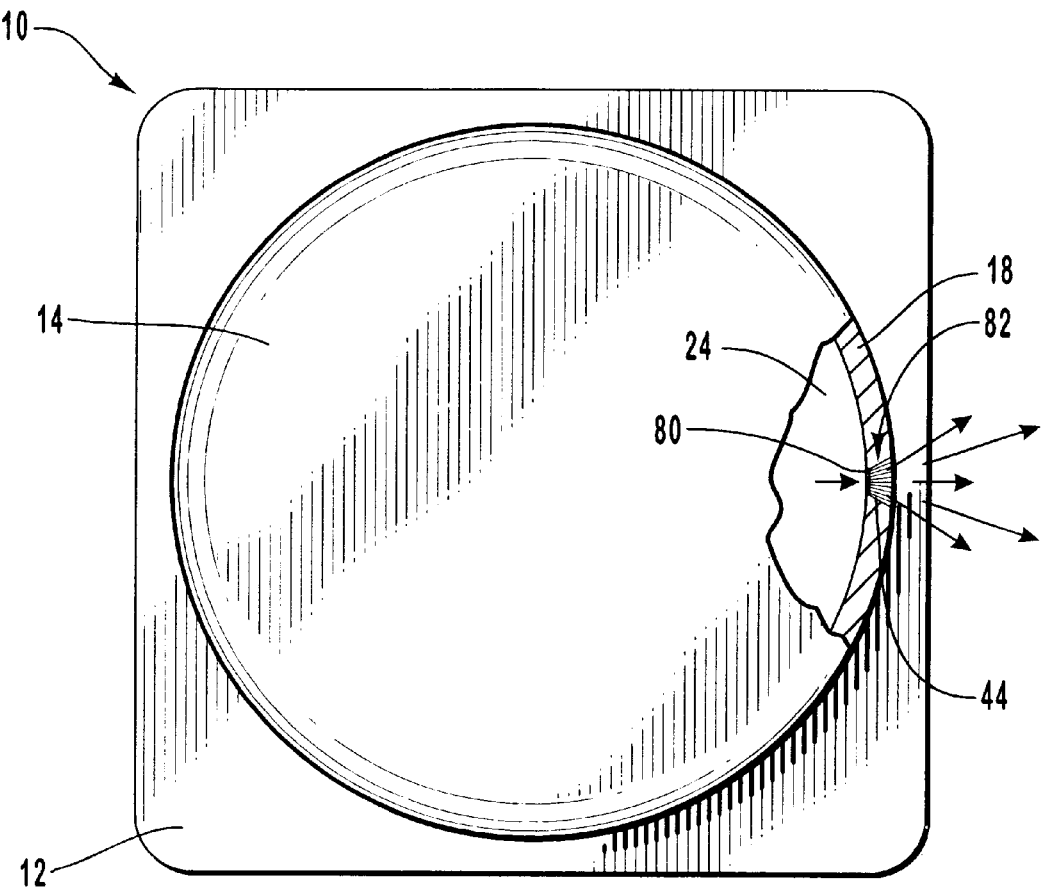
FIG. 8 is another embodiment of the apertures formed in the air bag assembly during the deployment of the air bag cushion.
Figure 9:
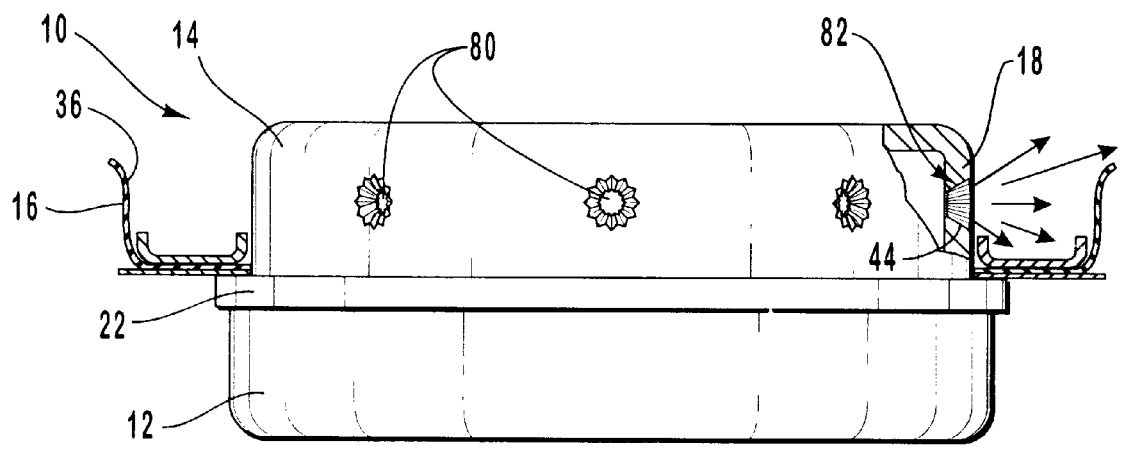
FIG. 9 is a partial cross-sectional elevation view of the structure of FIG. 8 with an air bag cushion attached thereto.

FIGS. 8 and 9 illustrate another embodiment of apertures 80 formed in side wall 18 of diffuser canister. As shown in the figures, apertures 80 are countersunk similar to apertures 26 illustrated in FIGS. 1–3. Apertures 80 are, however, star-shaped which results in apertures 80 having a non-smooth and irregular edge 82. Edge 82 comprises angled portion 44 which causes the gas flowing out aperture 80 to diffuse. As a result, in addition to the turbulence that is caused by the irregularity of edge 82 that defines aperture 80, angled portion 44 diffuses the gas.

Although FIGS. 1–5 and 7–8 depict the apertures having at least a small portion 46 of edge 42, 62, or 82 proximate to interior surface 38 of side wall 18 being at a different angle than angled portion 44 of the edge, it is not necessary. Angled portion 44 may instead extend substantially the entire length of the edge.

Tests were conducted with the countersunk apertures 26, illustrated in FIGS. 1–3 having various diameters. In addition, various diameters $d_1$ to wall thickness t ratios were studied in the tests to determine the effectiveness of the various configurations.

EXAMPLE 1

TABLE 1

| Equipment | Specifications |
|---|---|
| Air bag cushion | 315 denier, uncoated material |
| Gas Generation Inflator | MDN-2, Type 6 from AO# G3O084 |
|  | (85 grams of generant) |
| 12 apertures (total) | 6 apertures with $d_1$ = .125 inches |
|  | 6 apertures with $d_1$ = .156 inches |
| Thickness t of side wall | .130 inches |
| Angle α | 118° |
| Thickness of flat portion | .020 inches |
| $d_1$/t Ratio | .96 |
|  | 1.2 |

Discussion and Conclusion

A ratio of diameter $d_1$ to wall thickness t of 0.96 and 1.2 was used in this test. Adding a countersink to the apertures helped to disperse the gas stream from each aperture. Diffusing the gas reduced the concentration of the stream of gas and helped reduce the temperature and the pressure of the gas impacting upon the inside surface of the air bag cushion. Approximately a 50% reduction in the number of burned through locations in the throat or gas inlet opening of the air bag cushion were observed.

EXAMPLE 2

TABLE 2

| Equipment | Specifications |
|---|---|
| Air bag cushion | 420 denier, fully silicone coated material |
| Gas Generation Inflator | MDN-2, Type 4 and 6 from BS# GY8576 |
|  | (90 and 85 grams of generant) |
| 12 apertures (total) | 6 apertures with $d_1$ = .125 inches |
|  | 6 apertures with $d_1$ = .156 inches |
| Thickness t of side wall | .130 inches |
| Angle α | 118° |

TABLE 2-continued

| Equipment | Specifications |
|---|---|
| Thickness of flat portion | .020 inches |
| $d_1$/t Ratio | .96 |
|  | 1.2 |

Discussion and Conclusion

A ratio of diameter $d_1$ to wall thickness t of 0.96 and 1.2 was used in this test. Adding the countersink to the apertures helped to disperse the gas stream from each aperture. Diffusing the gas reduced the concentration of the stream of gas and helped to reduce the temperature and the pressure of the gas impacting upon the inside surface of the air bag cushion. Approximately a 50% reduction in the number of burned through location in the throat or gas inlet opening of the air bag cushion proximate to the retaining ring were observed.

EXAMPLE 3

TABLE 3

| Equipment | Specifications |
|---|---|
| Air bag cushion | 210 denier, light silicone coated material |
| Gas Generation Inflator | MDN-7, from BS# G49151 |
|  | (37 grams of generant) |
| 12 apertures (total) | 4 apertures with $d_1$ = .100 inches |
|  | 4 apertures with $d_1$ = .1285 inches |
|  | 4 apertures with $d_1$ = .136 inches |
| Thickness t of side wall | .060 inches |
| Angle α | 118° |
| Thickness of flat portion | .012 inches |
| $d_1$/t Ratio | 1.67 |
|  | 2.14 |
|  | 2.27 |

TABLE 4

| Equipment | Specifications |
|---|---|
| Air bag cushion | 210 denier, light silicone coated material |
| Gas Generation Inflator | MDN-7, BS# G49151 |
|  | (37 grams of generant) |
| 12 apertures (total) | 4 apertures with $d_1$ = .100 inches |
|  | 4 apertures with $d_1$ = .1285 inches |
|  | 4 apertures with $d_1$ = .136 inches |
| Thickness t of side wall | .060 inches |
| Thickness of flat portion | .060 inches |
| $d_1$/tRatio | 1.67 |
|  | 2.14 |
|  | 2.27 |

Discussion and Conclusion

Table 3 depicts the equipment and specifications used in Experiment 3. Table 4 depicts the standards used for a baseline comparison. A ratio of diameter $d_1$ to wall thickness t of 1.67, 2.14, and 2.27 were used in this test. Adding the countersink to the apertures helped to disperse the gas stream from each aperture. Diffusing the gas reduced the concentration of the stream and helped to reduce the temperature and the pressure of the gas impacting upon the inside surface of the air bag cushion. In this experiment, the width of the flat portion proximate to the diameter $d_1$ was reduced in comparison to that in Experiments 1 and 2. In addition, in this experiment there were three sizes of apertures instead of only two sizes.

A baseline run resulted in two (2) locations of burn through of the air bag cushion. In contrast, the configuration used in the experimental run of Experiment 3 resulted in no cushion burn through. The baseline run indicated that changing the size of the apertures and the numbers of the variously sized apertures as compared to Experiments 1 and 2 did not make a significant improvement. The addition of the countersink that resulted in the edge that defined the apertures having in an angled portion appears to be significant.

Diffusing and/or causing turbulence to the streams of gas exiting diffuser canister 14 reduces the concentration of the gas flow. The temperature and pressure is also decreased. Together these changes in the gas flow reduces and even eliminates any harmful effect the gas flow has on the air bag cushions. Designers of gas bag assemblies can continue to attempt to minimize the size of the module as well as use hotter and more energetic reactions in gas generation inflator 12.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An air bag device comprising:
   (a) an air bag cushion;
   (b) a diffuser canister having at least one aperture formed therein in direct communication with the interior of said air bag cushion;
   (c) a gas generation inflator configured to rapidly create a gas within said diffuser canister, said gas exiting said diffuser canister through said aperture so as to fill said air bag cushion; and
   (d) dispersing means for diffusing said gas exiting said diffuser canister through said aperture, said dispersing means comprising an edge defining said aperture, said edge being configured such that the cross-sectional area of said aperture increases as said gas exists said diffuser canister so as to diffuse said gas exiting said diffuser canister through said aperture.

2. An air bag device as recited in claim 1, wherein said edge defining said aperture comprises an angled portion, said angled portion being non-perpendicular to said diffuser canister.

3. An air bag device as recited in claim 2, wherein said angled portion of said edge on opposing sides of said aperture has an angle α in the range of about 20 degrees to about 145 degrees.

4. An air bag device comprising:
   (a) an air bag cushion having a gas inlet opening;
   (b) a diffuser canister having a plurality of walls configured to define an interior space therein, each of said plurality of walls having an interior surface, an exterior surface, and a wall thickness t, one of said plurality of walls having an aperture formed therethrough in direct communication with the interior of said air bag cushion, said aperture being defined by an edge extending between said interior surface and said exterior surface of said wall;
   (c) a gas generation inflator configured to rapidly create a gas within said diffuser canister, said gas exiting said diffuser canister through said aperture so as to fill said air bag cushion; and
   (d) dispersing means for diffusing said gas exiting said diffuser canister through said aperture, said dispersing means comprising an edge defining the perimeter of said aperture, said edge being configured such that a diameter of said aperture proximate to said exterior surface of said wall is larger than a diameter $d_1$ of said aperture proximate to said interior surface of said wall.

5. An air bag device as recited in claim 4, wherein said edge defining said aperture comprises an angled portion, said angled portion on opposing sides of said aperture having an angle α therebetween in the range of about 20 degrees to about 145 degrees.

6. An air bag device as recited in claim 5, wherein said angle α of said angled portions of said edge on opposing sides of said aperture having a range of about 110 degrees to about 130 degrees.

7. An air bag device comprising:
   (a) an air bag cushion;
   (b) a diffuser canister having a plurality of walls configured to define an interior space therein, each of said plurality of walls having an interior surface and an exterior surface, one of said plurality of walls having at least one aperture formed therethrough in communication with the interior of said air bag cushion;
   (c) a gas generation inflator configured to rapidly create a gas within said diffuser canister, said gas exiting said diffuser canister through said aperture so as to fill said air bag cushion; and
   (d) means for causing turbulence in said gas exiting said diffuser canister through said aperture, said means comprising an edge defining said aperture.

8. An air bag device as recited in claim 7, wherein said edge comprises an angled portion configured to cause said gas exiting from a first aperture to intersect a flow of gas exiting a second aperture such that turbulence is created in said gas flowing from said apertures.

9. An air bag device comprising:
   (a) an air bag cushion having a gas inlet opening;
   (b) a diffuser canister having a plurality of walls configured to define an interior space therein, each of said plurality of walls having an interior surface and an exterior surface;
   (c) a gas generation inflator configured to rapidly create a gas within said diffuser canister; and
   (d) an aperture formed through one of said plurality of walls, said aperture being in communication with the interior of said air bag cushion, said aperture having a non-smooth cross section configured to cause turbulence in said gas exiting said diffuser canister through said aperture.

10. An air bag device as recited in claim 9, wherein said aperture is defined by an edge extending between the interior surface and the exterior surface of said wall, said edge comprising an angled portion configured such that the cross-sectional area of each of said apertures increases as said gas exits said diffuser canister so as to diffuse said gas exiting said diffuser canister through said plurality of apertures in addition to causing turbulence.

* * * * *